May 27, 1947. W. J. DONNELLY 2,421,144
STEAM TRAP
Filed June 8, 1944 2 Sheets-Sheet 2

Inventor
William J. Donnelly,
Robert B. Larson
Attorney

Patented May 27, 1947

2,421,144

UNITED STATES PATENT OFFICE 2,421,144

STEAM TRAP

William J. Donnelly, New Britain, Conn.

Application June 8, 1944, Serial No. 539,362

4 Claims. (Cl. 236—56)

This invention relates to steam traps, and more specifically to thermostatic, bellows actuated types thereof.

One of the principal objects of this invention is to provide a bellows actuated thermostatic type of steam trap which is more sensitive and positive in its response to temperature variations than devices of a similar type which are generally employed in this art.

Another object of this invention is to provide means whereby the bellows of a steam trap of the type described may be substantially heat insulated from the main body or casing of the trap.

A still further object of this invention is to provide means for both observing and controlling the height of the water and condensate which accumulates within the body of the steam trap.

It is a still further object of this invention to provide guide means for the bellows during the activation thereof, the guide means serving also to prevent any lateral displacement of the bellows tensioned spring return element.

A still further object of this invention is to provide control means in the steam trap for eliminating air from the steam system.

Other and further objects and advantages of this invention will become manifest from a consideration of the following specification when read in the light of the accompanying drawings, in which.

Figure 1:
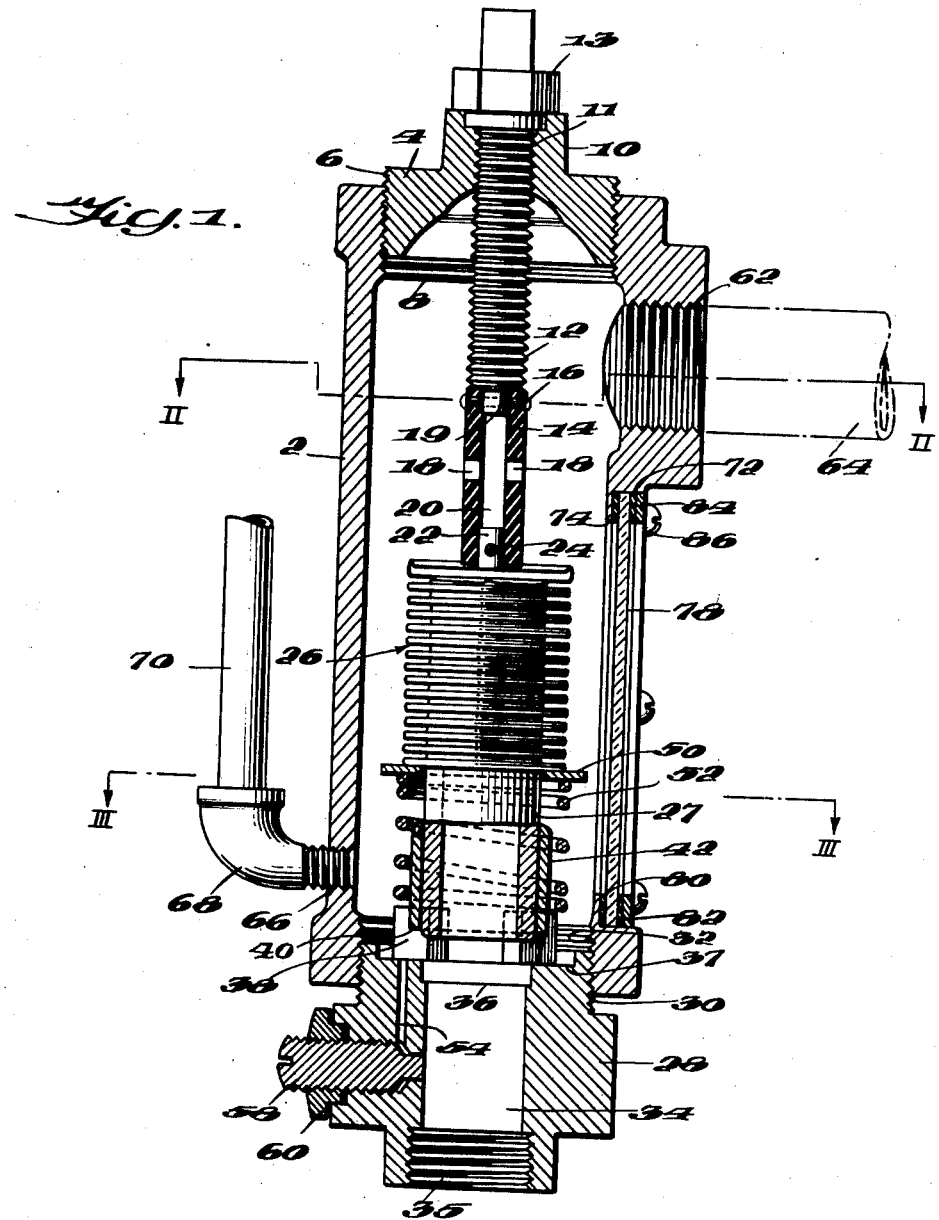
Figure 1 is a vertical cross-section of a steam trap, constructed according to this invention, the section being taken on the line I—I of Figure 2.

Referring now more specifically to Figure 1 of the drawings, the reference numeral 2 indicates a substantially hollow, cylindrical casing or housing member formed of any suitable material, and being open at its top and bottom ends. As seen in Figure 1, the top end is fitted with a plug 4 having external threads 6 cut into its periphery, the threads 6 being adapted to engage the complementary threads 8 formed on the interior surface of the housing 2.

The plug 4 is also provided with an upwardly projecting boss 10 having a central bore 11 formed therein, the bore being threaded in order to receive the complementary threaded shaft 12, which in turn is provided at its upper end with a lock nut 13 which also acts as a stuffing gland and is adapted to retain the shaft 12 in any desired vertical adjustment, and whose lower end has secured thereto an extension 14 formed from any desirable material having heat insulating properties, that is, material having relatively low heat conductivity.

Figure 2:
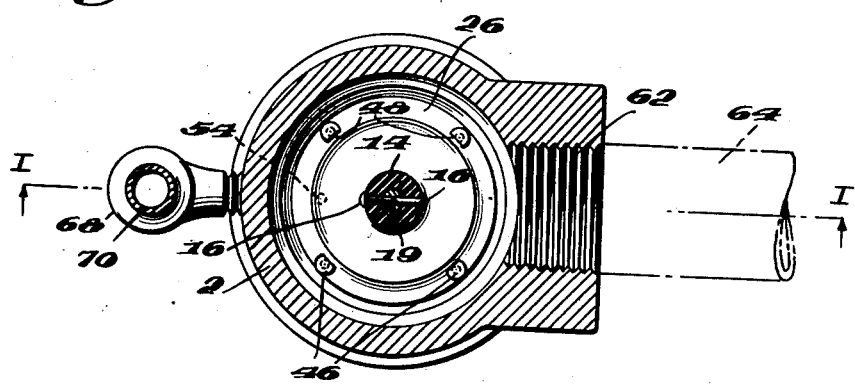
Figure 2 is a horizontal cross-section taken on the line II—II of Figure 1, looking in the direction of the arrows.

The extension element 14 is connected with the lower end of the shaft 12 by means of a transversely extending pin 16 which passes through diametrically opposed apertures formed in the wall of the extension element and through a channel formed in the projection 19 of the shaft 12 (see Figures 1 and 2).

The extension member 14 is constructed with a plurality of transversely extending openings 18 and a longitudinally extending passage 20 in order to reduce to a minimum the heat conducting factor.

A metallic bellows unit 26 is provided on its upper end with a projection 22 which is adapted to be secured to the lower end of the extension member 14 by means of a transversely extending pin 24 in the manner described above. The lower end of the bellows has rigidly secured thereto one end of a valve plug 27, the other end of the valve plug being adapted to seat in the valve seat 36 formed in the extension plug 28.

From the foregoing description it is now manifest that the plug 4, the shafts 12 and 14, the bellows 26, and the valve plug 27 may be assembled as a unit, and as a unit may be withdrawn from the interior of the housing 2.

The outer periphery of the extension plug 28 is threaded as at 30 and is adapted to engage the complementary threads 32 formed on the inner surface of the housing 2 at the lower end thereof. The plug 28 is also provided with a passageway 34 connected with a threaded extension 35 adapted to be connected by means of a conduit (not shown) with the return portion of the steam system.

Figure 3:
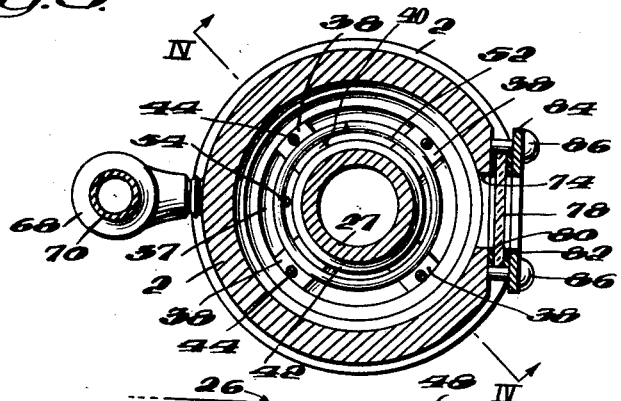
Figure 3 is a horizontal cross-section taken on the line III—III of Figure 1, looking in the direction of the arrows.

Lugs 38, shouldered as at 40 (see Figures 1, 3 and 4) are rigidly secured at spaced intervals around the circumference of the mouth of the valve seat 36. These are provided in order to mount releasably the valve plug guide collar 42 and are adapted to be threadedly engaged by screw threads formed on the lower end of the pins 44.

The upper ends of the pins 44 are provided with enlarged heads 46 having an inner flattened surface 48. These pins serve as guides for the apertured disk 50 which is slidably mounted thereon below heads 46 and is maintained in its uppermost position by the spring 52. The pins 44 also provide means for preventing lateral displacement of the spring 52 and the bellows 26.

Figure 4:
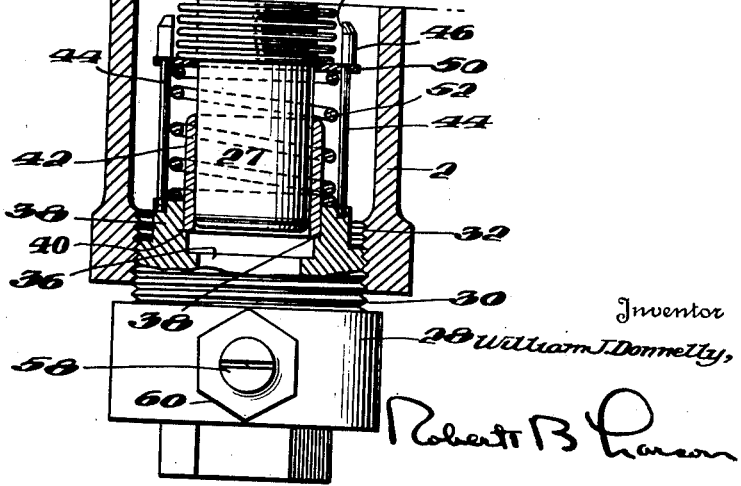
Figure 4 is a partial vertical cross-section taken on the line IV—IV of Figure 3.

As is seen in Figures 1 and 4 of the drawings, the disk 50 is interposed between the lower end of the bellows 26 and the upper end of the spring 52, the lower end of which abuts against the lugs 38.

The extension plug 28 is also provided with a passageway 54, which is disposed on one side of the passageway 34. One end of the passageway 54 communicates with the interior of the housing 2, while the other end of the passageway connects with the passageway 34 at a point below the valve seat 36. The passageway 54 is provided with a needle type control valve 58, which is locked in its desired control position by the lock nut 60.

Hence, it is seen that the extension plug 28, the lugs 38, the collar 42, apertured disk 50, spring 52, and valve 58 may also be assembled as a unit and removed as a unit from the interior of the housing 2.

Adjacent the upper end of housing 2 and on the wall thereof is formed an outwardly projecting threaded boss 62 adapted to threadedly engage the inlet conduit 64 (shown in broken lines in Figures 1 and 2). A threaded opening 66 is also formed in the lower end of the housing and is adapted to receive a complementary threaded end of the elbow pipe 68, the other end of which is secured to the terminal end of a conduit 70. The other end of the conduit 70 is connected with the headers of the steam system (not shown) to act as an air eliminator.

This invention also contemplates the provision of means permitting the operator to observe the height of the water and the condensate which has accumulated in the trap. These means comprise a slot 74 undercut at 72 in the wall of the housing, the slot being covered by a transparent element 78 provided with watertight seals 80 and 82, disposed on opposite sides thereof. The transparent element is releasibly secured on the housing by means of the open frame 84 and the cooperating headed screws 86.

The elements of this steam trap having been described in considerable detail, the operation thereof becomes quite apparent.

Assuming that the parts of the steam trap are in the position shown in Figure 1 and the steam system to which it is connected is in operation, live steam under pressure will enter into the housing 2 through the conduit 64. The bellows unit 26 then begins to heat and in so doing expands and moves the plug 27 downwardly against the tension of the spring 52, until it engages its seat 36. It is important to note that, during this heating operation the actuation of the bellows is influenced only by the action of the live steam thereon, no heat (or very little heat) being transmitted to the bellows through the shaft 12 and extension 14. This factor permits unusually critical control since the expansion and contraction of the bellows is now made directly responsive to the variation of temperature of the steam and the cooling action of the accumulated condensate.

At this point water and the condensate from the steam in the system begins to accumulate in the lower end of the steam trap. The operator then adjusts the needle valve 58 to maintain the heighth of the water at the desired level.

When the heating system commences to cool, a corresponding drop in the temperature of the water collected in the trap occurs, the cooling action of the condensate causing a contraction of the bellows 26 and a withdrawal of the valve plug 27 from its seat 36. This action is assisted by the spring 52 which constantly tends to urge the bellows in an upward direction. The upward movement of the spring 52 is arrested upon engagement of the disk 50 with the underside of the pin head 46. The contraction of the bellows, however, may continue until it is completely contracted.

Considerable difficulty is encountered in most steam heating systems when it is desired to start the system in operation, due to the presence of air in the various units thereof. To overcome this defect I have provided the conduit 70, having one of its ends connected with the interior of the housing 2, while the other end is connected to the header pipes of the steam system only while the system is being started, as by a valve (not shown) which is normally closed. It is now obvious that any air remaining in the system after it has cooled will be immediately forced into the steam trap and discharged through the passage 34 before the valve 27 closes.

Having described the invention in considerable detail, it is to be understood that the embodiment disclosed in the drawings and described in the specification has been offered merely by way of example, and that this invention is to be limited only by the scope of the following claims.

I claim:

1. A steam trap of the type described comprising, a substantially hollow cylindrical housing open at each end thereof, a plug having a bore formed therein and releasably secured on one of said ends, a shaft adjustably mounted in said bore and having one of its ends projecting within said housing, a second shaft formed of heat insulating material and having one of its ends rigidly secured to the inner end of said first shaft, a bellows unit, said bellows having one of its ends fixedly secured to the other end of said non-heat conductive shaft, a valve plug having one of its ends rigidly secured to the other end of said bellows, an extension plug releasably mounted on the other end of said housing and having an outlet passageway formed therein, a valve seat formed on the inner end of said outlet passageway, a plurality of lugs disposed about the mouth of said valve seat, said lugs being rigidly secured to said extension plug, a valve plug guide collar rigidly mounted on said lugs and encircling said valve plug, a pin mounted on each of said lugs, said pins being provided with enlarged heads, an apertured disk slidably mounted on said pins between said lugs and said enlarged heads, a spring under compression having one of its ends abutting the undersurface of said disk, the other end of said disk abutting against said lugs, said disk being disposed intermediate said bellows and said spring and being constantly urged in a direction away from said lugs by said spring, and an inlet passageway formed in said housing.

2. A steam trap, as defined in claim 1, and a second discharge passageway formed in said extension plug, and valve means for controlling the rate of discharge through said second passage.

3. A steam trap, as defined in claim 1, and a second discharge passageway, one end of said second discharge passageway junctioning with the interior of said housing, the other end of said second discharge passageway connecting with said first discharge passageway at a point below said valve seat, and valve means for controlling the discharge through said second passageway.

4. A steam trap, as defined in claim 1, and a transparent element mounted on said housing, said transparent element extending over a slot formed in the wall of said housing.

WILLIAM J. DONNELLY.

REFERENCES CITED

The following references are of record in the file of this patent:

UNITED STATES PATENTS

| Number | Name | Date |
| --- | --- | --- |
| 2,163,667 | Crowther et al. | June 27, 1939 |
| 894,806 | Ames | Aug. 4, 1908 |
| 1,735,614 | Layman | Nov. 12, 1929 |
| 2,255,118 | Hirshfeld | Sept. 9, 1941 |

FOREIGN PATENTS

| Number | Country | Date |
| --- | --- | --- |
| 17,724 | Great Britain | 1909 |
| 10,555 | Great Britain | 1913 |